United States Patent
Wieland

(10) Patent No.: US 12,410,052 B2
(45) Date of Patent: Sep. 9, 2025

(54) QUICK-CHANGE DEVICE FOR A FILLING ADAPTER

(71) Applicant: Dürr Somac GmbH, Stollberg (DE)

(72) Inventor: Frank Wieland, Burkhardtsdorf (DE)

(73) Assignee: Dürr Somac GmbH, Stollberg (DE)

( * ) Notice: Subject to any disclaimer, the term of this patent is extended or adjusted under 35 U.S.C. 154(b) by 326 days.

(21) Appl. No.: 18/249,678

(22) PCT Filed: Oct. 15, 2021

(86) PCT No.: PCT/DE2021/000174
§ 371 (c)(1),
(2) Date: Apr. 19, 2023

(87) PCT Pub. No.: WO2022/083814
PCT Pub. Date: Apr. 28, 2022

(65) Prior Publication Data
US 2023/0382711 A1    Nov. 30, 2023

(30) Foreign Application Priority Data
Oct. 20, 2020   (DE) ................ 10 2020 006 487.6

(51) Int. Cl.
*B67D 7/02* (2010.01)
*B67D 7/34* (2010.01)
*F16L 37/12* (2006.01)

(52) U.S. Cl.
CPC ............... *B67D 7/02* (2013.01); *B67D 7/344* (2013.01); *F16L 37/1225* (2013.01)

(58) Field of Classification Search
CPC ........ B67D 7/02; B67D 7/344; F16L 37/1225
See application file for complete search history.

(56) References Cited

U.S. PATENT DOCUMENTS

2003/0164200 A1    9/2003   Czeranna et al.

FOREIGN PATENT DOCUMENTS

| DE | 10 2005 043 751 A1 | 3/2007 |
| EP | 1 357 325 A2 | 10/2003 |

(Continued)

OTHER PUBLICATIONS

International Searching Authority, "International Search Report and Written Opinion," issued in connection with International Application No. PCT/DE2021/000174, Mar. 9, 2022, 11 pages, with English translation of the International Search Report.

*Primary Examiner* — Paul R Durand
*Assistant Examiner* — Michael J. Melaragno
(74) *Attorney, Agent, or Firm* — Hanley, Flight & Zimmerman, LLC

(57) ABSTRACT

The invention relates to a quick-change device for a filling adapter for filling vehicles on assembly lines in the automotive industry, on which circuits and containers of the vehicles are filled with operating materials which, starting from a filling system, are fed into the respective circuits and containers via hose assemblies with pneumatic and hydraulic lines and a filling adapter, wherein a separate connection plate is arranged at the separation point of the hose assembly from the filling system, and wherein a connection block is designed as a functional counterpart to the connection plate on the filling system. It is the object of the invention to create such a quick-change device which enables automatic clamping of the connection plate and connection block and which is structurally integrated into one of these two assemblies. The object is achieved in that the connection block (1) comprises a continuous channel structure (6) along its central longitudinal axis, in which structure a tie rod (3) is arranged, and in that an assembly (5) with a pneumatic (Continued)

cylinder (7) is arranged on the connection block (1) on the end face opposite the connection plate (2), wherein the tie rod (3) is enclosed in the channel structure (6) on a section of its axial extension by a spring assembly (4) which is supported in a fixed position on the tie rod (3) at its two end face sections by means of a respective fastening element (8), wherein the pneumatic cylinder (7) comprises a piston surface with which the upper end face of the tie rod (3) can be acted upon, wherein the tie rod (3) has, at its end section opposite the pneumatic cylinder (7), a receiving geometry (11) in the form of a cylinder screw, and wherein the connection plate (2) has a receiving geometry (9) in the form of an elongated hole in such a way that the connection plate (2) can be suspended on the tie rod (3), in that this receiving geometry (9) in relation to the longitudinal axis of the tie rod (3) passes in the radial direction from a section (A) with a first open cross section in the form of the receiving geometry (11) formed as a cylinder screw on the tie rod (3) into a section (B) with a second open cross section which has a narrower contour opening than the first open cross section and an undercut, and wherein the inner installation space from the undercut has a contour in the form of the cylinder screw (11) formed on the tie rod (3).

4 Claims, 2 Drawing Sheets

(56) References Cited

FOREIGN PATENT DOCUMENTS

| | | |
|---|---|---|
| EP | 2 818 596 A2 | 12/2014 |
| EP | 3 521 521 A1 | 8/2019 |
| WO | 2019/099354 A1 | 5/2019 |

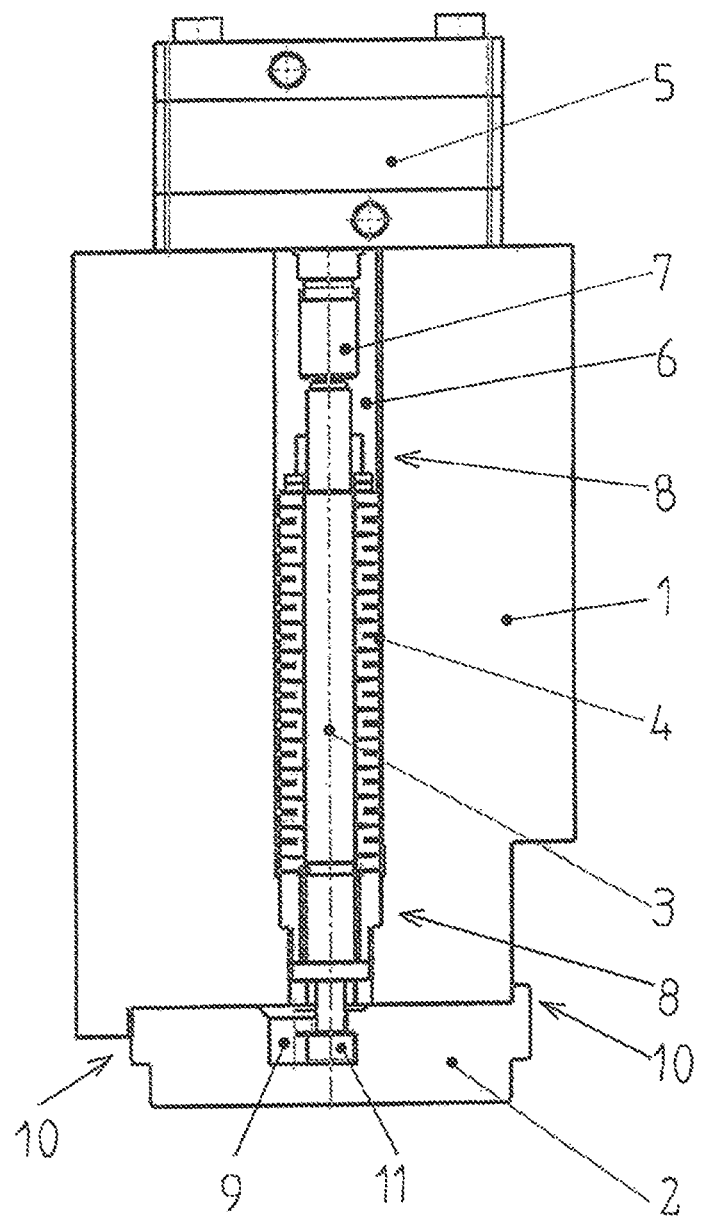

QUICK-CHANGE DEVICE FOR A FILLING ADAPTER

RELATED APPLICATION

This application is a national phase of international application No. PCT/DE2021/000174, filed on Oct. 15, 2021, and claiming the benefit of German application No. 10 2020 006 487.6, filed on Oct. 20, 2020, both of which are incorporated herein by reference in their entirety and for all purposes.

SUMMARY

The invention relates to a quick-change device for a filling adapter for filling vehicles on assembly lines in the automotive industry, on which circuits and containers of the vehicles are filled with operating materials which, starting from a filling system, are fed into the respective circuits and containers via hose assemblies with pneumatic and hydraulic lines and a filling adapter, wherein a separate connection plate is arranged at the separation point of the hose assembly from the filling system to which all pneumatic and hydraulic lines are connected, which are connected to the filling system via bores and seals, wherein a connection block is designed as a functional counterpart to the connection plate on the filling system, and wherein the connection plate and the connection block have a congruent bore pattern, so that, in the assembled state, flow paths with identical contours are formed in the connection area of the connection plate and connection block.

During vehicle production, circuits, containers, and similar assemblies of the vehicles must be filled with operating materials for the first time on assembly lines in the automotive industry. The operating materials, for example fuel, brake fluid, coolant or refrigerant, are fed into the respective circuits and containers of the vehicles in largely automated processes starting from a filling system via hose assemblies with a large number of pneumatic and hydraulic lines as well as filling adapters. The filling adapters are adapted manually by workers or automatically by robots on the vehicle to respective interfaces. The principle of such assembly lines is known, for example, from US 2003 016 4200 A1.

Since the operating materials differ in part depending on the specific vehicle types to be filled, the filling adapters must be replaced where required. To replace the filling adapters, a separate connection plate is preferably arranged at the separation point of the hose assembly from the filling system. All pneumatic and hydraulic lines, which are connected to the filling system via holes and seals, are connected to this connection plate. A connection block is provided on the filling system as a functional counterpart to the connection plate. The connection plate and the connection block have a congruent hole pattern so that, when assembled, flow paths with identical contours are formed in the connection area of these assemblies.

The connection plate can be attached to the connection block in a simple manner using a screw connection. However, since it is often necessary to change the filling adapters directly in the production process and thus inevitably under time pressure, a screw connection of this type inevitably results in disadvantages because of the time required for loosening or connecting. This has led to the increasing use of quick-change devices instead of screw connections for fastening the connection plate to the connection block.

Technical solutions in which one assembly must be temporarily clamped to another assembly are suitable for the design of such quick-change devices. Clamping devices of this type are known from toolmaking and are described in DE 10 2005 043 751 A1, for example. This basic solution approach has so far also been used for quick-change devices for fastening the connection plate to the connection block. The connection plate is fastened to the connection block by means of two clamping elements and two retractable nipples, each of which is operatively connected to manually operable hand levers. The retractable nipples are retracted into the clamping element by swiveling the hand levers. This presses the seals together and fixes the connection plate firmly in position on the connection block.

Quick-change devices of this type have basically proved their worth and ensure a functionally reliable connection between the connection plate and the connection block. The disadvantage, however, is that these are completely manual solutions. To change a filling adapter, a worker must loosen both clamping elements by hand and remove the filling adapter. Automatic unclamping of the filling adapter is therefore not possible. Furthermore, if the hand levers are not operated synchronously, the two clamping elements, which act independently of each other, often cause the connection plate to tilt, so that the functional reliability of the entire filling process can be impaired. In addition, the manufacturer of a filling system for this purpose has so far had to purchase the clamping elements as separate and cost-intensive assemblies from other manufacturers.

The object of the invention is to provide a quick-change device for a filling adapter which allows automatic clamping of the connection plate and connection block and which is structurally integrated into one of these two assemblies.

This object is achieved in that the connection block comprises a continuous channel structure along its central longitudinal axis, in which structure a tie rod is arranged, and in that an assembly with a pneumatic cylinder is arranged on the connection block on the end face opposite the connection plate, wherein the tie rod is enclosed in the channel structure over a section of its axial extent by a spring assembly which is supported in a fixed position on the tie rod at its two end face sections by means of a respective fastening element, wherein the pneumatic cylinder comprises a piston surface with which the upper end face of the tie rod can be acted upon, wherein the tie rod has, at its end section opposite the pneumatic cylinder, a receiving geometry in the form of a cylinder screw, and wherein the connection plate has a receiving geometry in the form of an elongated hole in such a way that the connection plate can be hooked to the tie rod, in that this receiving geometry, with respect to the longitudinal axis of the tie rod, merges in the radial direction from a section with a first open cross section in the form of the receiving geometry formed as a cylinder screw on the tie rod into a section with a second open cross section, which has a narrower contour opening than the first open cross section as well as an undercut, and wherein the inner installation space of the undercut has a contour in the form of the cylinder screw formed on the tie rod. Advantageous embodiments, the technical features of which will be explained in more detail based on an exemplary embodiment, are the subject matter of dependent claims.

The essential feature of the quick-change device for a filling adapter according to the invention is therefore a spring assembly arranged centrally in the connection block, by means of whose operative connection with further components an exact fixing of the connection plate or the hose assembly to the connection block as well as a functionally reliable compression of the seals are achieved.

This results in advantages over the state of the art. This means that the replacement of a filling adapter can now be prepared automatically and carried out without the need for separate tools. The spring action ensures a seal between the connection block and the connection plate even when in the switched-off state during an interrupted power and/or compressed air supply.

The quick-change device according to the invention is suitable both for the initial equipping of a filling system at the manufacturers premises and for subsequent retrofitting at the users premises. The quick-change system can be used to fill vehicles with different operating materials.

An exemplary embodiment of the invention is explained below with reference to the drawing.

BRIEF DESCRIPTION OF THE DRAWINGS

FIG. 1 shows a sectional view of the basic structure of the quick-change device

Figure 4:
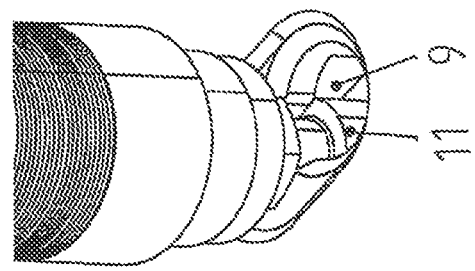
FIG. 4 shows the insertion of the tie rod into the connection plate in a third position The quick-change device shown in the drawing is designed for a filling adapter, not shown in more detail here, for filling vehicles on assembly lines in the automotive industry, where circuits, containers, and similar assemblies of the vehicles are each filled with different operating materials. These operating materials (fuel, brake fluid, coolant, refrigerant, etc.) are fed into the respective circuits and containers starting from a filling system via hose assemblies with a plurality of pneumatic and hydraulic lines and the filling adapter.

A separate connection plate 2 is arranged at the separation point of the hose assembly from the filling system to which all pneumatic and hydraulic lines are connected, which are connected to the filling system via bores and seals. A connection block 1 is designed as a functional counterpart to the connection plate 2 on the filling system. The connection plate 2 and the connection block 1 have a congruent bore pattern so that, in the assembled state, flow paths with identical contours are formed in the connection area of connection plate 2 and connection block 1.

Such a structure is basically known, so that further explanations are not necessary. However, what is essential in the present case is the specific design.

DETAILED DESCRIPTION OF THE DRAWINGS

According to FIG. 1, the connection block 1 comprises a continuous channel structure 6 along its central longitudinal axis. A tie rod 3 is arranged in the interior of the channel structure 6. An assembly 5 with a pneumatic cylinder 7 is arranged on the connection block 1 at the end face opposite the connection plate 2. The pneumatic cylinder 7 comprises a piston surface which can be applied to the upper end face of the tie rod 3.

The tie rod 3 is enclosed by a spring assembly 4 over a section of its axial extent. The spring assembly 4 is supported in a fixed position on the tie rod 3 at its two end sections, each with a fastening element 8. Preferably, a washer or bushing resting on each end face of the spring assembly 4 and a screw movable on a threaded section of the tie rod 3 are used for this purpose. Alternatively, a design with a washer or bushing resting on each end face of the spring assembly 4 and a split pin that can be supported in a radially extending bore of the tie rod 3 is possible. However, the fastening elements 8 can also be designed differently.

Figure 3:
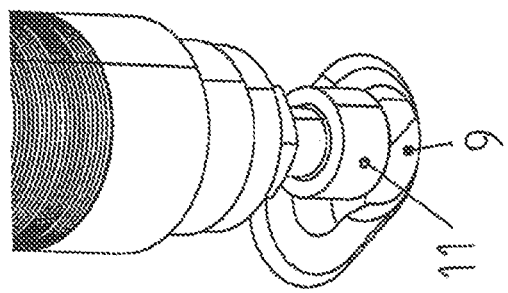
FIG. 3 shows the insertion of the tie rod into the connection plate in a second position
Figure 2:
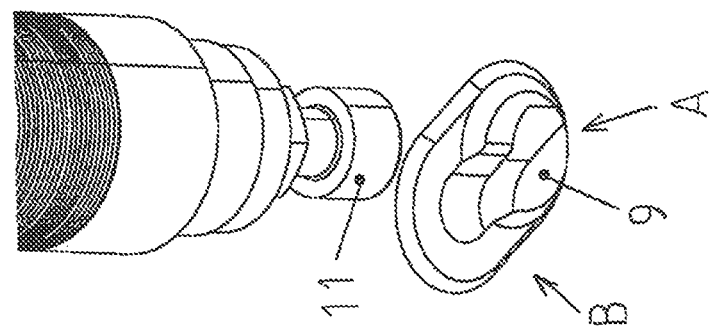
FIG. 2 shows the insertion of the tie rod into the connection plate in a first position

At its end section opposite the pneumatic cylinder 7, the tie rod 3 comprises a receiving geometry 11 in the form of a cylinder screw, an enlarged view of which can be seen in FIG. 2 and FIG. 3.

The connection plate 2 has a receiving geometry 9, the structure of which can be seen primarily from FIG. 2. This receiving geometry 9 is designed so that the connection plate 2 can be hooked to the tie rod 3. For this purpose, the receiving geometry 9 is designed in the form of an elongated hole and has a section "A" with a first open cross-section in the form of the cylinder screw 11 formed on the tie rod 3 in relation to the longitudinal axis of the tie rod 3. Section "A" merges in radial direction into a section "B" having a second open cross-section. Section "B" has a narrower contour opening than the first open cross-section in section "A." In addition, section "B" comprises an undercut. The inner installation space of the undercut has a contour in the form of the cylinder screw 11 formed on the tie rod 3.

These geometric configurations of the receiving geometries 9 and 11 allow the connection plate 2 to be hooked to the tie rod 3. Accordingly, a force-locking connection of connection plate 2 and connection block 1 can be achieved via tie rod 3.

In an advantageous embodiment, the connection block 1 and the connection plate 2 each comprise at least one step-shaped component section 10 that are congruent with one another and can be brought into operative connection with one another. According to the embodiment shown in FIG. 1, two such component sections 10 can also be provided. Thus, in addition to the force-locking connection via the tie rod 3, a positive connection is achieved via the component sections 10, so that an exact positional fixation of connection block 1 and connection plate 2 is ensured.

The quick-change device shown in the drawing has the following functional sequence:

FIG. 2 shows the assemblies in the detached state of connection block 1 with the receiving geometry 11 designed as a cylinder screw and connection plate 2 with the receiving geometry 9 designed as an elongated hole.

To mount the connection plate 2 together with the hose assembly on the connection block 1, the spring assembly 4 must first be preloaded. For this purpose, the pneumatic cylinder 7 presses from above on the tie rod 3 and compresses the spring assembly 4. The receiving geometry 11 in the form of a cylinder screw designed in the lower area of the tie rod 3 is moved downward when the spring assembly 4 is compressed, see FIG. 3. By means of the special receiving geometry 9 on the connection plate 2, it is possible to hook this connection plate 2 to the tie rod 3.

As soon as the connection plate 2 is hooked to the tie rod 3 as shown in FIG. 4, the pneumatic cylinder 7 is moved back again and the spring assembly 4 can relax a little. In the process, the tie rod 3 is pulled upwards and simultaneously takes the connection plate 2 upwards with it. As soon as the connection plate 2 is in contact with the connection block 1, the seals are compressed. The still preloaded spring assembly 4 pulls the connection plate 2 to the connection block 1 and thus fixes it in place.

This technical solution enables fully automatic preparation of a change of a filling adapter. The system prepares for the adapter change in a special step by draining the hydraulic lines and depressurizing the control lines. The connection plate 2 together with the hose assembly is unlocked. After the changeover, an equally automatic coupling of the filling adapter is possible. The worker just has to remove the connection plate 2 with the hose assembly and to hook it in again. As the fixation is effected via the spring assembly 4, a positional fixation of connection block 1 and connection plate 2 is reliably ensured even when the system is switched off and depressurized.

LIST OF REFERENCE NUMERALS

- 1 Connection block
- 2 Connection plate
- 3 Tie rod
- 4 Spring assembly
- 5 Pneumatic assembly
- 6 Channel structure in the connection block
- 7 Pneumatic cylinder
- 8 Fastening element
- 9 Receiving geometry on connection plate/elongated hole
- 10 Step-shaped component section
- 11 Receiving geometry on connection block/cylinder screw
- A Section with large cross-sectional opening on the receiving geometry of the connection plate
- B Section with undercut on the receiving geometry of the connection plate

The invention claimed is:

1. A quick-change device for a filling adapter for filling vehicles on assembly lines, on which circuits and containers of the vehicles are filled with operating materials which, starting from a filling system, are provided into the respective circuits and containers via hose assemblies with pneumatic and hydraulic lines and a filling adapter, the quick-change device comprising:

a separate connection plate arranged at a separation point of the hose assembly from the filling system to which all pneumatic and hydraulic lines are connected, which are connected to the filling system via bores and seals, and a connection block designed as a functional counterpart to the connection plate on the filling system, wherein the connection plate and the connection block have a congruent bore pattern, so that, in the assembled state, flow paths of identical contour are formed in the connection area of the connection plate and the connection block, wherein:

the connection block includes a continuous channel structure along its central longitudinal axis, in which structure a tie rod is arranged, and in that an assembly with a pneumatic cylinder is arranged on the connection block on the end face opposite the connection plate, wherein the tie rod is enclosed in the channel structure on a section of its axial extension by a spring assembly which is supported in a fixed position on the tie rod at its two end face sections by a respective fastening element, wherein the pneumatic cylinder includes a piston surface with which the upper end face of the tie rod can be acted upon, wherein the tie rod has, at its end section opposite the pneumatic cylinder, a receiving geometry in the form of a cylinder screw, wherein the connection plate has a receiving geometry in the form of an elongated hole in such a way that the connection plate can be hooked to the tie rod, in that this receiving geometry with respect to the longitudinal axis of the tie rod passes in the radial direction from a section with a first open cross section in the form of the receiving geometry formed as a cylinder screw on the tie rod into a section with a second open cross section which has a narrower contour opening than the first open cross section and an undercut, and wherein the inner installation space of the undercut has a contour in the form of the cylinder screw formed on the tie rod.

2. The quick-change device according to claim 1, wherein the connection block and the connection plate each have at least one step-shaped component section that is congruent with one another and can be operatively coupled with one another.

3. The quick-change device according to claim 1, wherein the fastening elements for positionally fixed support of the spring assembly on the tie rod each comprise a washer or bushing resting on the end face of the spring assembly and a screw movable on a threaded portion of the tie rod.

4. The quick-change device according to claim 1, wherein the fastening elements for positionally fixed support of the spring assembly on the tie rod each include a washer or bushing resting on the end face of the spring assembly and a split pin which can be supported in a radially extending bore of the tie rod.

* * * * *